(12) United States Patent
Park (10) Patent No.: US 7,809,881 B2
(45) Date of Patent: Oct. 5, 2010

(54) RECORDING MEDIUM WITH OVERLAPPING SEGMENT INFORMATION THEREON AND APPARATUS AND METHODS FOR FORMING, RECORDING ON, AND REPRODUCING THE RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/292,679

(22) Filed: Nov. 24, 2008

(65) Prior Publication Data

US 2009/0109805 A1 Apr. 30, 2009

Related U.S. Application Data

(63) Continuation of application No. 11/061,782, filed on Feb. 22, 2005, now Pat. No. 7,480,764.

(60) Provisional application No. 60/553,961, filed on Mar. 18, 2004.

(30) Foreign Application Priority Data

May 31, 2004 (KR) .................. 10-2004-0039144
Jul. 2, 2004 (KR) .................. 10-2004-0051609

(51) Int. Cl.
*G06F 12/00* (2006.01)
*G11B 7/24* (2006.01)

(52) U.S. Cl. ............ 711/112; 369/275.3; 711/E12.035; 711/E12.067

(58) Field of Classification Search .................. None
See application file for complete search history.

(56) References Cited

U.S. PATENT DOCUMENTS

| 5,237,553 | A | 8/1993 | Fukushima et al. |
| 5,315,447 | A | 5/1994 | Nakayama et al. |
| 5,386,402 | A | 1/1995 | Iwata |
| 5,552,776 | A | 9/1996 | Wade et al. |

(Continued)

FOREIGN PATENT DOCUMENTS

CN 1441430 9/2003

(Continued)

OTHER PUBLICATIONS

Chinese Office Action dated Oct. 31, 2008 with English translation.

(Continued)

*Primary Examiner*—Reginald G Bragdon
*Assistant Examiner*—Aracelis Ruiz
(74) *Attorney, Agent, or Firm*—Harness, Dickey & Pierce, P.L.C.

(57) ABSTRACT

A recording medium, such as a high-density and/or optical recording medium including segment information recorded thereon, and apparatus and methods for recording to and reproducing from the recording medium, in order to improve data protection, data management and/or reproduction compatibility. The recording medium may contain at least one segment area which is an area on the disc controlled by a plurality of valid PACs and if the designated segment areas overlap with one another, control information of the respective PACs which control the overlapped area may be applied to control the overlapped area.

33 Claims, 10 Drawing Sheets

U.S. PATENT DOCUMENTS

| | | | |
|---|---|---|---|
| 5,815,485 | A | 9/1998 | Tanaka et al. |
| 6,115,346 | A | 9/2000 | Sims, III |
| 6,315,447 | B1 | 11/2001 | Nord et al. |
| 6,330,210 | B1 | 12/2001 | Weirauch et al. |
| 6,351,788 | B1 | 2/2002 | Yamazaki et al. |
| 6,526,522 | B1 | 2/2003 | Park et al. |
| 6,580,684 | B2 | 6/2003 | Miyake et al. |
| 6,621,783 | B1 | 9/2003 | Murata |
| 6,691,209 | B1 | 2/2004 | O'Connell |
| 6,725,200 | B1 | 4/2004 | Rost |
| 6,912,188 | B2 | 6/2005 | Morishima |
| 6,963,523 | B1 | 11/2005 | Park |
| 7,219,202 | B2 | 5/2007 | Satoyama et al. |
| 7,230,893 | B2 | 6/2007 | Park |
| 2001/0018727 | A1 | 8/2001 | Ando et al. |
| 2002/0036643 | A1 | 3/2002 | Namizuka et al. |
| 2002/0078295 | A1 | 6/2002 | Shaath et al. |
| 2002/0136118 | A1 | 9/2002 | Takahashi |
| 2002/0136134 | A1 | 9/2002 | Ito et al. |
| 2003/0035355 | A1 | 2/2003 | Morishima |
| 2003/0048731 | A1 | 3/2003 | Ozaki |
| 2003/0137915 | A1 | 7/2003 | Shoji et al. |
| 2003/0169660 | A1 | 9/2003 | Shirai et al. |
| 2003/0185130 | A1 | 10/2003 | Kamperman et al. |
| 2003/0210627 | A1 | 11/2003 | Ijtsma et al. |
| 2003/0212564 | A1 | 11/2003 | Sawabe et al. |
| 2004/0013061 | A1 | 1/2004 | Wu |
| 2004/0174793 | A1 | 9/2004 | Park et al. |
| 2004/0193946 | A1 | 9/2004 | Park et al. |
| 2004/0207318 | A1 | 10/2004 | Lee et al. |
| 2004/0218488 | A1 | 11/2004 | Hwang et al. |
| 2004/0228238 | A1 | 11/2004 | Ko et al. |
| 2004/0246852 | A1 | 12/2004 | Hwang et al. |
| 2005/0111315 | A1 | 5/2005 | Hwang et al. |
| 2005/0169132 | A1 | 8/2005 | Kuraoka et al. |
| 2005/0195716 | A1 | 9/2005 | Ko et al. |
| 2005/0207294 | A1 | 9/2005 | Park |
| 2005/0207320 | A1 | 9/2005 | Park |
| 2005/0259560 | A1 | 11/2005 | Park |
| 2006/0120697 | A1 | 6/2006 | Beged-Dov et al. |
| 2006/0221689 | A1 | 10/2006 | Yoshida et al. |
| 2006/0280068 | A1 | 12/2006 | Weirauch et al. |
| 2007/0053267 | A1 | 3/2007 | Brondijk |
| 2007/0211589 | A1 | 9/2007 | Park |
| 2007/0211590 | A1 | 9/2007 | Park |

FOREIGN PATENT DOCUMENTS

| | | |
|---|---|---|
| EP | 0495471 | 7/1992 |
| EP | 1067517 | 1/2001 |
| EP | 1251508 | 10/2002 |
| EP | 1306840 | 5/2003 |
| EP | 1 329 888 | 7/2003 |
| EP | 01381047 | 1/2004 |
| EP | 1 505 597 | 2/2005 |
| EP | 1 587 102 | 10/2005 |
| JP | 06-259886 | 9/1994 |
| JP | 10-049986 | 2/1998 |
| JP | 10-092149 | 4/1998 |
| JP | 11-39801 | 2/1999 |
| JP | 11-066751 | 3/1999 |
| JP | 2000-285029 | 10/2000 |
| JP | 2000-322835 | 11/2000 |
| JP | 2000-322841 | 11/2000 |
| JP | 2001-126407 | 5/2001 |
| JP | 2001-351334 | 12/2001 |
| JP | 2002-092873 | 3/2002 |
| JP | 2002-124037 | 4/2002 |
| JP | 2002-175668 | 6/2002 |
| JP | 2002-278821 | 9/2002 |
| JP | 2002-328848 | 11/2002 |
| JP | 2003-059063 | 2/2003 |
| JP | 2003-208779 | 7/2003 |
| JP | 2003-228835 | 8/2003 |
| JP | 2004-005842 | 1/2004 |
| JP | 2004-30779 | 1/2004 |
| JP | 2007-503820 | 10/2007 |
| JP | 2008-052289 | 3/2008 |
| MX | 05001548 | 5/2005 |
| RU | 2208844 | 7/2003 |
| WO | WO 03/030173 | 4/2003 |
| WO | WO 03/102936 | 12/2003 |
| WO | WO 04/001753 A1 | 12/2003 |
| WO | WO 04/001754 A1 | 12/2003 |
| WO | WO 2004/015708 | 2/2004 |
| WO | WO 2004/081936 | 3/2004 |
| WO | WO 2004/019326 | 9/2004 |
| WO | WO 2004/100159 | 11/2004 |
| WO | WO 2005/004154 | 1/2005 |
| WO | WO 2005/086598 | 9/2005 |

OTHER PUBLICATIONS

Mexican Office Action dated Oct. 2, 2008.
Mexican Office Action dated Jan. 10, 2008.
English translation of Russian Office Action dated Mar. 18, 2009.
Russian Decision of Grant dated Jun. 31, 2009 with English translation.
United States Office Action dated Apr. 29, 2009.
Australian Office Action dated Oct. 30, 2009.
PCT International Search Report dated Aug. 8, 2005 for Application No. PCT/KR2005/000593.
Blu-Ray Disc Association: "Rewritable Blu-Ray Disc (BD-RE) Multi-media Command Set Description, Version 0.80" [online] Nov. 9, 2004, XP002479115, pp. 13-14.
European Search Report dated May 23, 2008.
European Search Report dated Jul. 30, 2008.
European Search Report dated Aug. 4, 2008.
Japanese Official Notice of Directive for Consultation with English translation dated Mar. 2, 2010 for corresponding Japanese Application No. 2008-052289.
Japanese Office Action with English translation dated Mar. 2, 2010 for corresponding Japanese Application No. 2008-052289.
Japanese Official Notice of Directive for Consultation with English translation dated Mar. 2, 2010 for corresponding Japanese Application No. 2007-503820.
Japanese Office Action with English translation dated Mar. 2, 2010 for corresponding Japanese Application No. 2007-503820.
Russian Notice of Allowance dated Oct. 22, 2009 with English translation.
Japanese Office Action dated Nov. 6, 2009 with English translation.
Japanese Notice of Allowance dated Jun. 4, 2010 for corresponding Japanese Application No. 2007-503821 with English translation.
Japanese Office Action dated Jun. 4, 2010 for corresponding Japanese Application No. 2008-033295.

| | | BD-RE | BD-R | BD-ROM |
|---|---|---|---|---|
| INFO2 | Reserved | 128 | 128 | 160 |
| | PAC 2 | 32 | 32 | 32 |
| | DMA 2 | 32 | 32 | |
| | Control Data 2 | 32 | 32 | 32 |
| | Buffer 3 | 32 | 32 | 32 |
| | Buffer 2 | 32 | 32 | 192 |
| INFO1 | Drive Area | 32 | 128 | |
| | Reserved | 96 | | |
| | DMA 1 | 32 | 32 | |
| | Control Data 1 | 32 | 32 | 32 |
| | PAC 1 | 32 | 32 | 32 |

| Data Frame | Byte position in Data Frame | contents | number of bytes |
|---|---|---|---|
| 0 | 0 | PAC_ID | 4 |
| 0 | 4 | PAC Update Count | 4 |
| 0 | 8 | Unknown PAC Rules | 4 |
| 0 | 12 | Entire_Disc_Flags | 1 |
| 0 | 13 | reserved and set to 00h | 2 |
| 0 | 15 | Number of Segments | 1 |
| 0 | 16 | Segment_0 | 8 |
| 0 | 24 | Segment_1 | 8 |
| 0 | 32 | : | 29*8 |
| 0 | 264 | Segment_31 | 8 |
| 0 | 272 | reserved and set to 00h | 112 |
| 0 | 384 | PAC specific information | 1664 |
| 1 | 0 | PAC specific information | 2048 |
| : | : | : | : |
| 31 | 0 | PAC specific information | 2048 |

FIG. 5

| Area | | Bits | Control type |
|---|---|---|---|
| | | b31 to b24 | reserved |
| | ⋮ | ⋮ | ⋮ |
| INFO 1,2,3,4 | DMA Zones | b7 | write |
| Data Zones | Spare Areas | b6 | write |
| INFO 1,2,3,4 | Control Data Zones | b5 | write |
| | | b4 | read |
| Data Zones | User Data Area | b3 | write |
| | | b2 | read |
| INFO 1&2 | PAC Cluster | b1 | write |
| | | b0 | read |

FIG. 9

RECORDING MEDIUM WITH OVERLAPPING SEGMENT INFORMATION THEREON AND APPARATUS AND METHODS FOR FORMING, RECORDING ON, AND REPRODUCING THE RECORDING MEDIUM

DOMESTIC PRIORITY

This is a continuation application of U.S. application Ser. No. 11/061,782, now U.S. Pat. No. 7,480,764, filed on Feb. 22, 2005 which claims priority of U.S. Provisional Application Ser. No. 60/553,961 filed on Mar. 18, 2004 the entire contents of both of which are hereby incorporated by reference.

FOREIGN PRIORITY

This application claims priority on Korean Application Nos. 10-2004-0039144, filed on May 31, 2004 and 10-2004-0051609, filed on Jul. 2, 2004, in the Korean Intellectual Property Office, the entire contents of each of which are hereby incorporated by reference.

BACKGROUND OF THE INVENTION

1. Field of the Invention

The present invention relates to managing physical access control (PAC) and recording data, media containing PAC and recording data (for example, high density optical discs, such as Blu-ray Disc) and apparatus and methods for recording and/or reproducing data to and/or from the media.

2. Discussion of the Related Art

Media, for example, optical discs may be used for recording a large quantity of data. Of the optical discs available, a new high density optical media (HD-DVD), for example, the Blu-ray Disc (hereafter called as "BD") is under development, which enables increased recording and/or storing of high definition video and/or audio data.

BD further includes a rewritable Blu-ray disc (BD-RE), Blu-ray disc writable once (BD-WO), and Blu-ray disc read only (BD-ROM).

Currently, one problem with existing systems is the potential incompatibility between drives of different versions, for example a drive of a previous version with a previous set of capabilities may have difficulty interacting with a medium that has interacted with a drive including at least one capability from a subsequent set of capabilities.

SUMMARY OF THE INVENTION

Example embodiments of the present invention provide a PAC cluster including segment information on a medium, such as a high density optical disc, and apparatus and methods for recording data to and reproducing data from the medium using a PAC cluster including segment information identifying at least one segment in a user data area, where segments of a same PAC cluster are not overlapped.

Example embodiments of the present invention provide a PAC cluster including segment information on a medium, such as a high density optical disc, and apparatus and methods for recording data to and reproducing data from the medium using a PAC cluster including segment information, wherein at least one segment in a first PAC cluster may overlap with at least one segment of a second PAC cluster.

Example embodiments of the present invention provide physical access control (PAC) cluster including segment information recorded thereon, in order to improve data protection, improve data management, improve reproduction compatibility, avoid destruction of data, and/or reduce unnecessary, repetitive operations.

Example embodiments of the present invention provide a medium, such as a high density optical disc, and apparatus and methods for managing a PAC including segment information.

In an example embodiment, the present invention is directed to a recording medium having a data structure for managing a data area of a recording medium including at least one physical access control (PAC) cluster, the at least one PAC cluster including information for managing recording to and/or reproducing from the recording medium, each PAC cluster including segment information identifying at least one segment in a user data area, wherein segments of a same PAC cluster are not overlapped.

In an example embodiment, the present invention is directed to a method of controlling access to a recording medium including identifying a first and second physical access control (PAC) cluster, each including segment information identifying non-overlapping segments in a user data area of the recording medium, wherein at least one segment in a first PAC cluster overlaps with at least one segment of a second PAC cluster and controlling access to overlap areas of the at least one segment in the first PAC cluster and the second PAC cluster depending on at least one overlap rule.

In an example embodiment, the present invention is directed to a method of recording on a recording medium including identifying a first and second physical access control (PAC) cluster, each including segment information identifying non-overlapping segments in a user data area of the recording medium, wherein at least one segment in the first PAC cluster overlaps with at least one segment of the second PAC cluster and recording to overlap areas of the at least one segment in the first PAC cluster and the at least one segment of the second PAC cluster if both PAC cluster permit to record to the at least one segment.

In an example embodiment, the present invention is directed to a method of reproducing from a recording medium including identifying a first and second physical access control (PAC) cluster, each including segment information identifying non-overlapping segments in a user data area of the recording medium, wherein at least one segment in the first PAC cluster overlaps with at least one segment of the second PAC cluster and reproducing from overlap areas of the at least one segment in the first PAC cluster and the at least one segment of the second PAC cluster if both PAC cluster permit to reproduce from the at least one segment.

In an example embodiment, the present invention is directed to an apparatus for recording to and/or reproducing from a recording medium having a data area including a controller for controlling recording or reproducing based on at least one physical access control (PAC) cluster including a first and second physical access control (PAC) cluster, wherein when at least one segment in the data area defined by the first PAC cluster overlaps with at least one segment in the data area defined by the second PAC cluster; recording to or reproducing from overlap areas is not permitted if recording to or reproducing from any one of the at least one segment of the first and second PAC cluster is not permitted and a pick-up for recording to or reproducing from the recording medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of example embodiments of the invention and are incorporated in and constitute a part of this application, illustrate example embodiment(s) of the invention where.

DETAILED DESCRIPTION OF EXAMPLE EMBODIMENTS OF THE INVENTION

Reference will now be made in detail to example embodiments of the present invention, examples of which are illustrated in the accompanying drawings. Wherever possible, the same reference numbers will be used throughout the drawings to refer to the same or like parts.

In an example embodiment, in addition to its ordinary and customary meaning, the term "physical access control (PAC)" may include additional information being recorded on the disc for managing/controlling data recording and reproduction for an entire disc or a specific segment within a physical zone of the disc. The term "physical access control (PAC)" may be referred to as "PAC", "PAC information", and/or "PAC control information" for simplicity.

In addition, a zone within the disc on which the PAC is recorded may be referred to as a "PAC zone" and the PAC being recording in the PAC zone in cluster units may be referred to as a "PAC cluster" for simplicity.

Furthermore, a PAC according to example embodiments of the present invention may include an "unknown rule", which may restrict read/write of data for the entire disc or a specific segment, for a drive having a specifically unknown PAC_ID and including a drive of a previous version (for example, a "legacy" version). A PAC having an "unknown rule" applied thereto may be referred to as an "Unknown PAC". Similarly, a known specific PAC_ID recorded on the PAC may be referred to as a "known rule" and "PAC specific information" that is applied to the PAC may be referred to as a "Known PAC".

A structure in which the PAC is recorded on the PAC zone, and apparatus and method for recording and reproducing a data by using the same will be described with reference to the attached drawings.

Figure 1A:
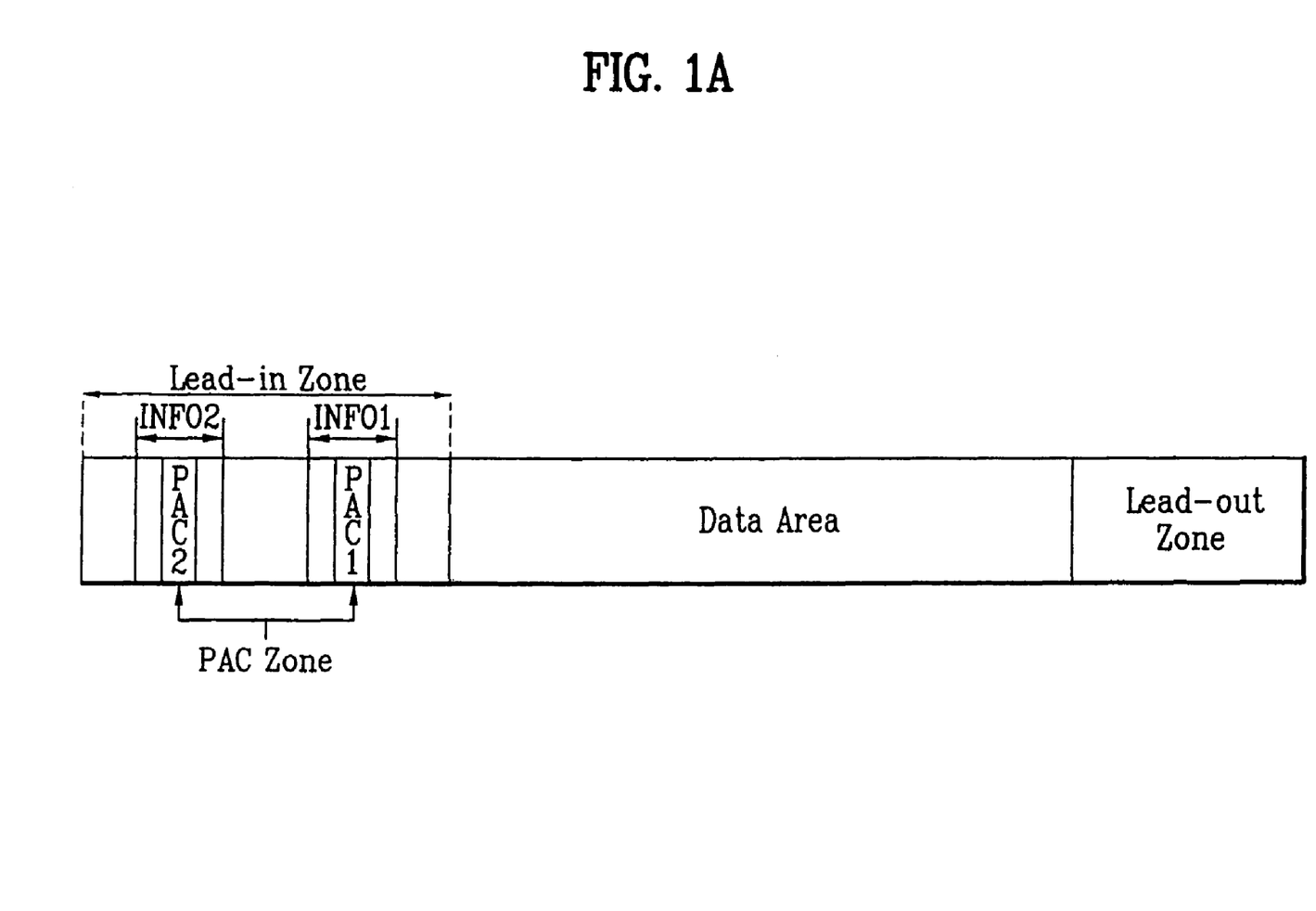
FIGS. 1A and 1B illustrate PAC zones on a high density optical disc in accordance with an example embodiment of the present invention.
Figure 1B:
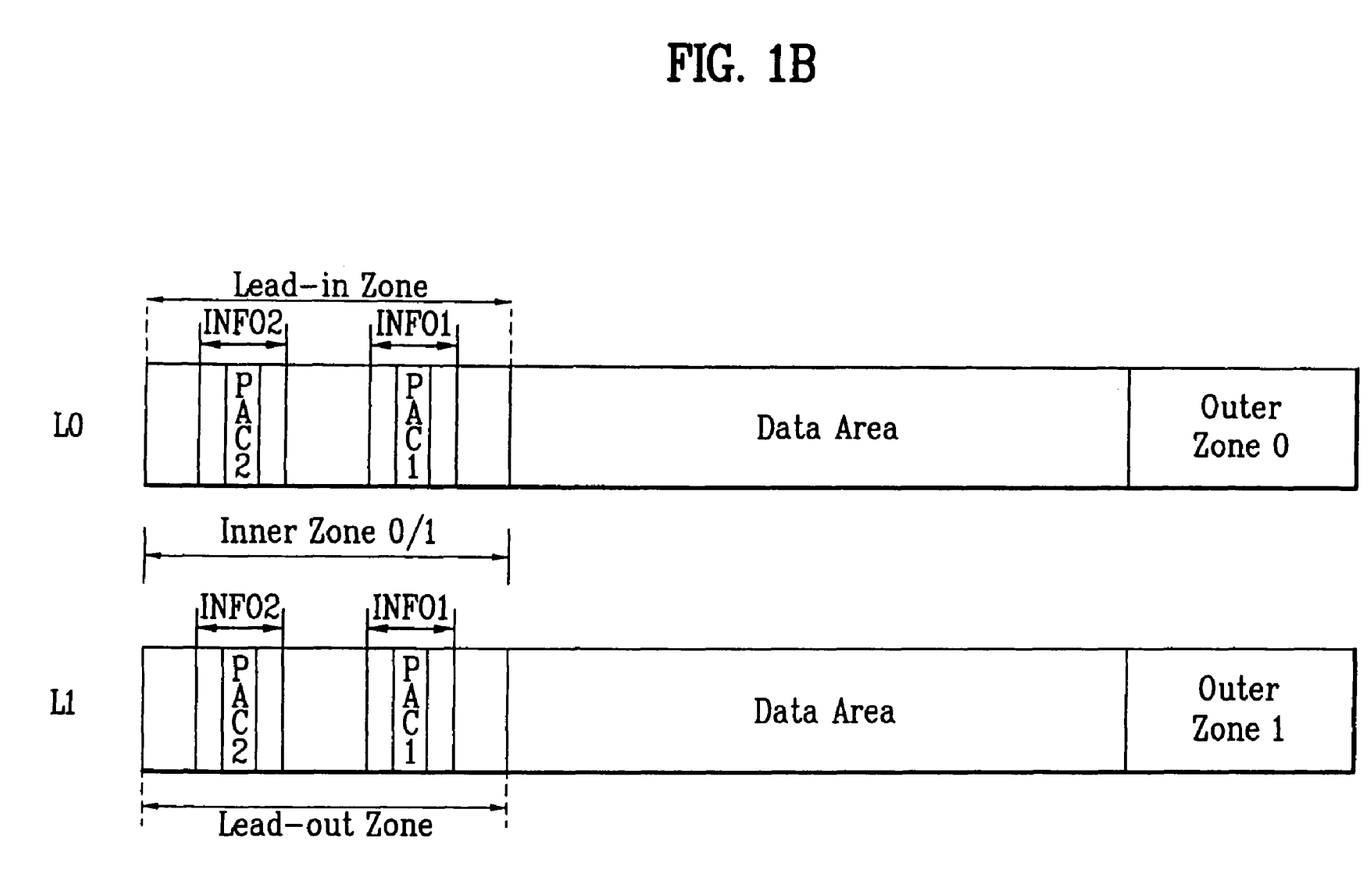

FIG. 1A or 1B illustrate PAC zones on a high density optical disc in accordance with an example embodiment of the present invention.

Referring to FIG. 1A, the high density optical disc may be partitioned from an inner circumference to an outer circumference, into a lead-in zone, a data zone, and a lead-out zone.

The lead-in zone may be further partitioned into an INFO2 zone and an INFO1 zone for recording various kinds of information thereon. The INFO2 zone and an INFO1 zone may include PAC (Physical Access Control) zones.

For convenience, a PAC zone assigned to the INFO2 zone may be labeled a PAC2 zone and the PAC zone assigned to the INFO1 zone may be labeled a PAC1 zone. One of the PAC2 zone and the PAC1 zone may have an original PAC recorded thereon and the other one may have a back up zone for recording a copy of the original PAC. If a writing direction is from the inner circumference to the outer circumference of the disc, it may be advantageous that the original PAC is recorded on the PAC2 zone and the backup PAC is recorded on the PACT PAC1 zone.

FIG. 1B illustrates a diagram of a dual layer disc structure having two recording layers including first recording layer (L0: Layer 0) and second recording layer (L1: Layer 1), wherein each of the recording layers includes a Lead-in/out Zone (also called as an Inner Zone), a Data Area, and an Outer Zone 0, or 1.

Each of the lead-in zone (inner zone 0) and the lead-out zone (inner zone 1) may include an INFO 2 zone and an INFO 1 zone for recording management information of the disc, and the PAC zones may be located in the INFO2 zone and/or the INFO1 zone.

Similar to a single layer disc, a PAC zone assigned to the INFO2 zone may be labeled a PAC2 zone and the PAC zone assigned to the INFO1 zone may be labeled a PAC1 zone. One of the PAC2 zone and the PAC1 zone may have an original PAC recorded thereon and the other one may have a back up zone for recording a copy of the original PAC. If a writing direction is from the inner circumference to the outer circumference of the disc, it may be advantageous that the original PAC is recorded on the PAC2 zone and the backup PAC is recorded on the PAC1 zone.

In the example shown in FIG. 1B, because the PAC1 and PAC2 zones are not only in the lead-in zone, but also in the lead-out zone for the dual layer disc, the dual layer disc has a PAC size two times greater than the single layer disc.

The PAC zone may be provided to handle problems that may occur when an older version of a drive apparatus cannot detect functions on a disc added having functions compatible with a newer version of a drive apparatus. The PAC zone may handle compatibility problems using one or more an "unknown rules".

An "unknown rule" may be used to control predictable operations of the disc, for example, basic control of read, write, etc., linear replacement of a defective zone, logical overwrite, etc. An area may also be provided on the disc, indicating where the "unknown rule" is applicable, for example, segments for defining the entire disc or a certain portion of the disc, which is described later in more detail.

In areas of the disc managed by the "unknown rule", there may be provided a DMA (Disc Management Area), a Spare Area, a User Data Area, and/or other similar areas.

Thus, by defining an area of the disc, an older version drive apparatus is able to access by using the "unknown rule", a newer version of the disc reduces unnecessary access operation of the older version drive apparatus.

Moreover, by defining an accessible area on a physical area of the disc for an older version drive apparatus to access by using the PAC, a data area containing user data recorded thereon can be protected more robustly and/or unauthorized access (for example, hacking) of the disc may be prevented or reduced.

The INFO2 zone and the INFO1 zone having the PAC2 and 1 zones therein in the lead-in zone may be reviewed in view of writable characteristics of the high density optical disc.

Figure 2:
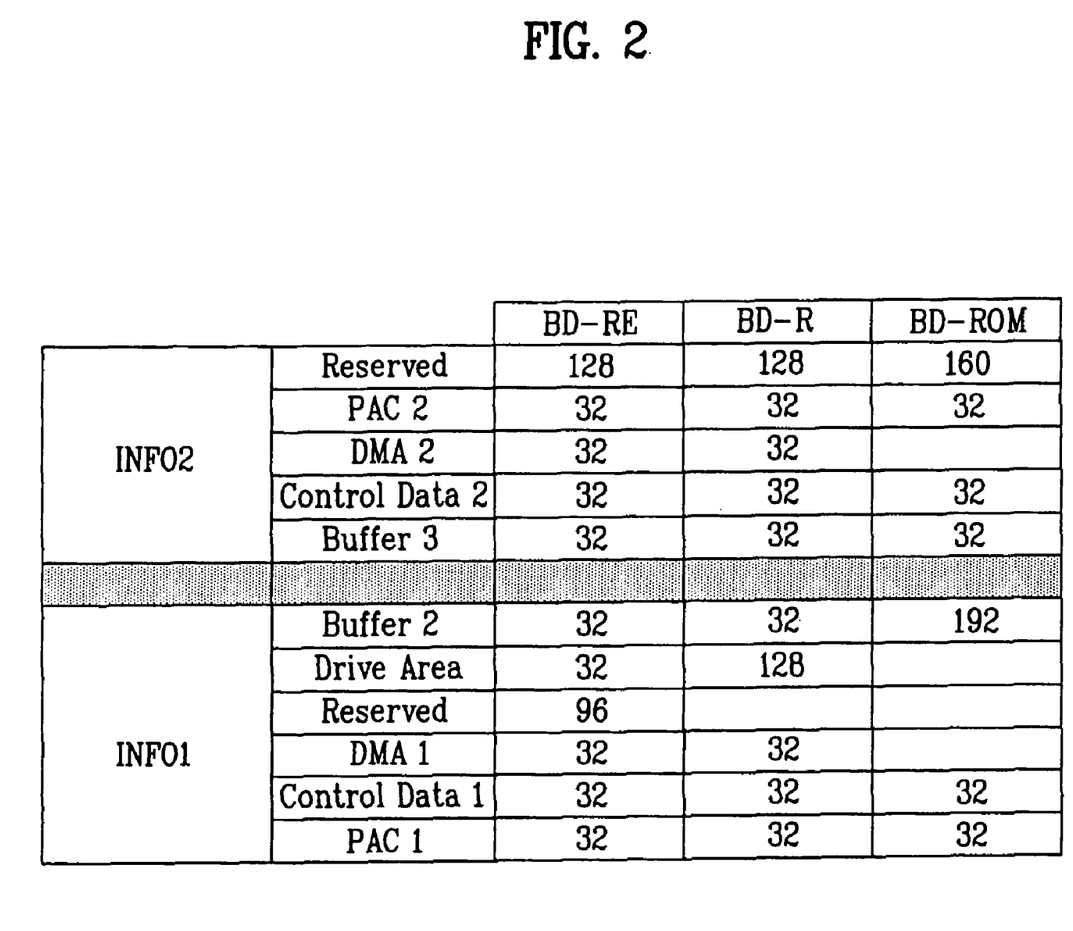
FIG. 2 illustrates an INFO2 zone and INFO1 zone on a high density optical disc in accordance with an example embodiment of the present invention.

FIG. 2 illustrates INFO2 zone and the INFO1 zone on a high density optical disc in accordance with an example embodiment of the present invention.

Referring to FIG. 2, for an example BD-RE high density optical disc, the INFO2 zone may have 256 clusters including 32 clusters of PACII zone, 32 clusters of DMA (Defect Management Area) 2 zone for management of defects, 32 clusters of CD (Control Data) 2 zone having control information recorded thereon, and/or 32 clusters of BZ (Buffer Zone) 3 zone of a buffer zone.

The INFO1 zone may include 32 clusters of BZ2 zone of a buffer area, 32 clusters of drive area which may be a drive area for storing information specific to a drive, 32 clusters of DMA1 zone for managing defects, 32 clusters of CD1 zone for recording control information, and/or a BZ1-PACI zone utilizable as the PAC zone.

For a write once high density optical disc (BD-R), the INFO2 zone may have 256 clusters including a PAC2 zone, a DMA 2 zone, a CD 2 zone, and a BZ 3 zone, each with 32 clusters, and the INFO1 zone includes a BZ2 zone, a DMA1 zone, a CD1 zone, and/or a BZ1-PAC1 zone, each with 32 clusters, and 128 clusters of drive area.

For a read only high density optical disc (BD-ROM), the INFO2 zone may have 256 clusters including a PAC2 zone, a CD 2 zone, and a BZ 3 zone, each with 32 clusters, and the INFO1 zone 256 clusters including a CD1 zone, and/or a BZ1-PAC1 zone, each with 32 clusters.

The PAC zones of example embodiments of the present invention may be assigned to the INFO2 zone and/or the INFO1 zone in the lead-in zone in 32 clusters each, according to rewritable characteristics of the high density optical disc.

In an example of a dual layer disc having two recording layers, the PAC zone may be designated, not only in the lead-in zone, but also in the lead-out zone, such that one PAC zone may have 64 clusters.

In a PAC zone of 32 clusters (or 64 clusters), one PAC may have one cluster, for recording a plurality of valid PACs. There also may be a plurality of one cluster sized PACs if desired. An example structure in which one PAC is recorded as one cluster is described with reference to FIG. 3.

Figure 3:
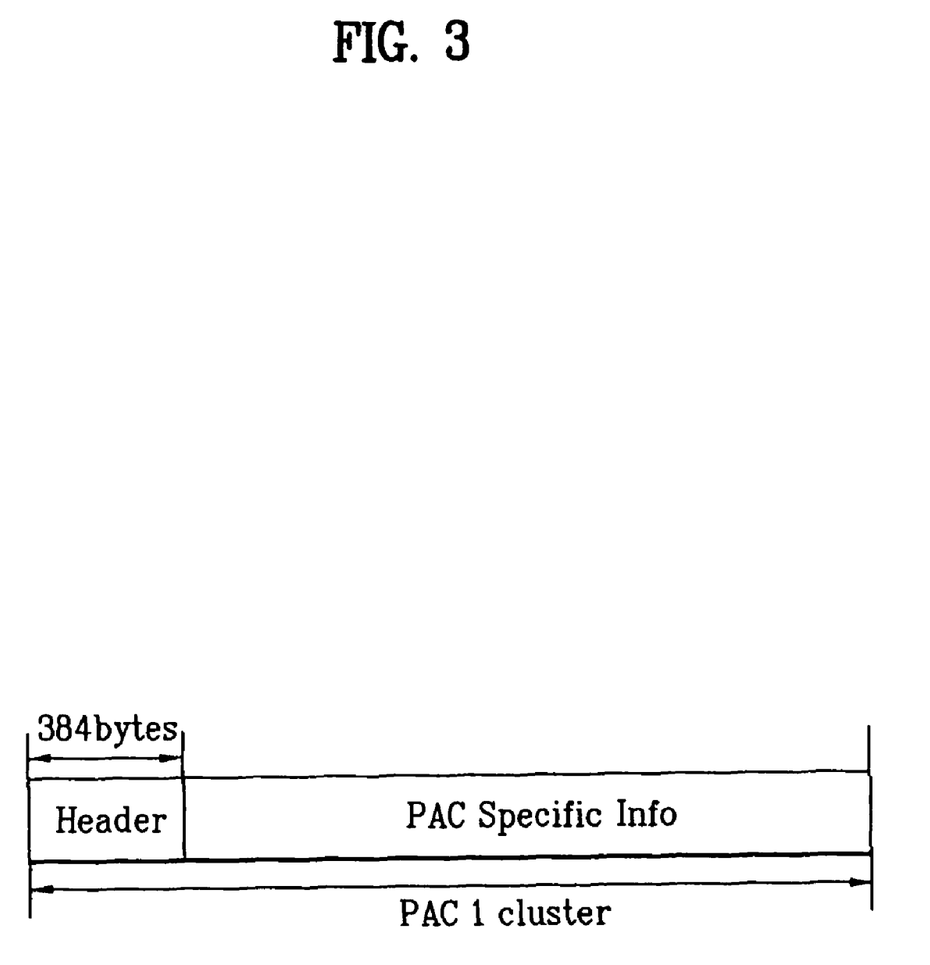
FIG. 3 illustrates a PAC recorded on a high density optical disc in accordance with an example embodiment of the present invention.

FIG. 3 illustrates a diagram of a structure of a PAC recorded on a high density optical disc in accordance with an example embodiment of the present invention.

Referring to FIG. 3, one PAC of one cluster size (32 sectors) may include a header zone and a specific information zone, specific to a particular disc drive (for example, optical disc drive).

The PAC header zone may have 384 bytes allocated to a first sector of the PAC, for recording various kinds of PAC information, such as information on an "unknown PAC rule" and segments, and another area of the PAC zone may have information specific to the (optical) disc drive may be referred to as "known rules" recorded thereon.

An example structure of a PAC recorded in above structure is described with reference to FIG. 4. For convenience, in the description, particular fields of the PAC that require more detailed description will refer to drawings that illustrate the particular fields.

Figure 4:
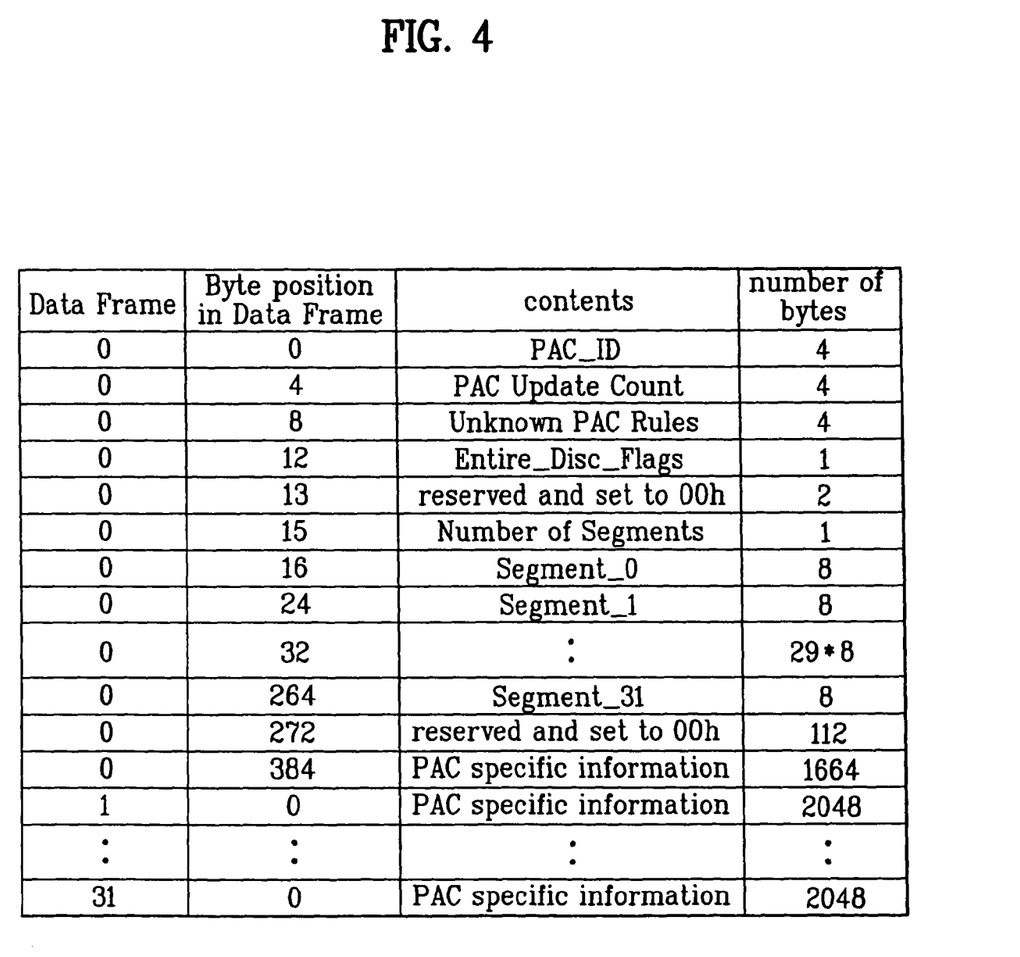
FIG. 4 illustrates a PAC on a high density optical disc in accordance with an example embodiment of the present invention.

FIG. 4 illustrates a diagram showing a structure of a PAC on a high density optical disc in accordance with an example embodiment of the present invention.

Referring to FIG. 4, the PAC may include a header portion (in an example, up to 384 bytes of the first frame) applicable to all PACs and an area having information specific to the drive, recorded thereon.

An example header portion may include 4 bytes of "PAC_ID", 4 bytes of "Unknown PAC Rules", 1 byte of "Entire Disc Flag", 1 byte of "Number of Segments", and/or 32 "segments Segment_0~Segment_31 each with 8 bytes.

The "PAC_ID" may provide the present PAC status and identification codes, for example, if the "PAC_ID" is '00 00 00 00h', the "PAC_ID" may indicate that the present PAC is not used, and if the "PAC_ID" is 'FF FF FF FFh', the "PAC_ID" may indicate that the present PAC zone is available for use again even if the PAC zone has been used previously.

By recording the "PAC_ID" in predetermined bits, such as '54 53 54 00h', the "PAC_ID" is used as a code for determining if the disc is one that the present drive can make free access. That is, if the present drive does not know the "PAC_ID" applied thus, determining that this is a case when the present drive can not understand the present PAC under a reason of version mismatch, or the like, the '54 53 54 00h' is used as code requiring to refer to information recorded on the "Unknown PAC Rules" field.

As described, the "Unknown PAC Rules" field may be used as a field that designates an operation range of a drive that can not recognize the present PAC, which will be described further with reference to FIG. 5.

Figure 5:
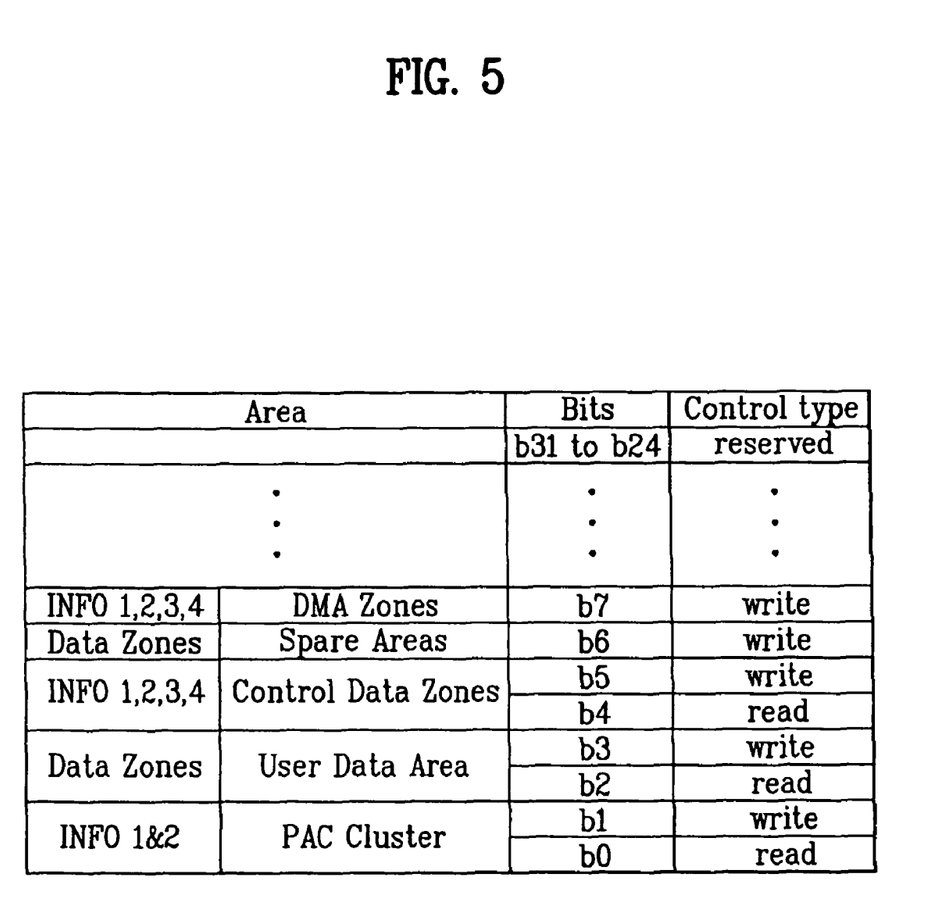
FIG. 5 illustrates an "Unknown PAC Rules" field in accordance with an example embodiment of the present invention.

FIG. 5 illustrates a diagram showing a configuration of an "Unknown PAC Rules" field in accordance with an example embodiment of the present invention.

Referring to FIG. 5, a degree of controllability of various areas on the disc may be enabled by the "Unknown PAC Rules". In this example, the "Area" column in FIG. 5 represents the controllable areas on the disc, the "Control" column represents control types, such as read/write etc., and "Number of bits" column represents a number of bits required for control. The additional bits in the "Number of bits" column may represent cases of dual layer disc with two recording/reproduction sides.

"Unknown PAC Rules" may be used to control a number of areas on a disc. For example, "Unknown PAC Rules" can indicate recording controllability on Disc Management Area (DMA) zones (which may or may not include a Disc Definition Structure (DDS) in the INFO 1, 2, 3 and/or 4 zone, can indicate recording controllability on the Spare Areas in the Data Zone, can indicate recording and/or reproducing controllability on the Control Data (CD) Zone in the INFO1, 2, 3, and/or 4 zones, can indicate recording and/or reproducing controllability on the User Data Area in the Data Zone, and/or can indicate recording and/or reproducing controllability on the "PAC cluster" in the INFO1 and/or 2 zone.

In an example of the User Data Area, if a segment area which is a "special" area on the disc (which is described below) is defined, the User Data Area may be used as a field for indicating recording and/or reproducing controllability on the segment area, and not necessarily the entire User Data Area.

Write controllability is applicable only to re-writable discs BD-RE and BD-R and the write controllability of a replacement area for a defective area is also applicable to the rewritable discs BD-RE and BD-R. As a result, various example features of the present invention may depend on the re-writable characteristics of the high density (optical) disc.

Using the above technique, the "Unknown PAC Rules" field enables designation of a controllable area on the disc for a drive with a version mismatch. Moreover, the above technique may also be applicable to control access to a particular physical area on a disc at a user's option.

Returning to FIG. 4, the "PAC Update Count" field in FIG. 4, may indicate a number of the PAC updates, may have '0' written initially, and/or may be incremented by one every time the PAC is re-written.

Further, in FIG. 4, the "Entire Disc Flag" field may be used as a field for indicating that the PAC is applicable to an entire area of the disc and the "Number of Segments" field is a field that may represent a number of segment areas to which the PAC is applicable.

In an example embodiment, a maximum number of segments may be allocatable to one PAC. In an example embodiment, a maximum number of 32 segments can be allocated to one PAC and information on the allocated segments may be written in "Segment_0" to "Segment_31" fields, each including 8 bytes. Each of the "Segment_0~31" fields may include the first physical sector number (PSN) and the last PSN of the allocated segment area recorded thereon.

Figure 6:
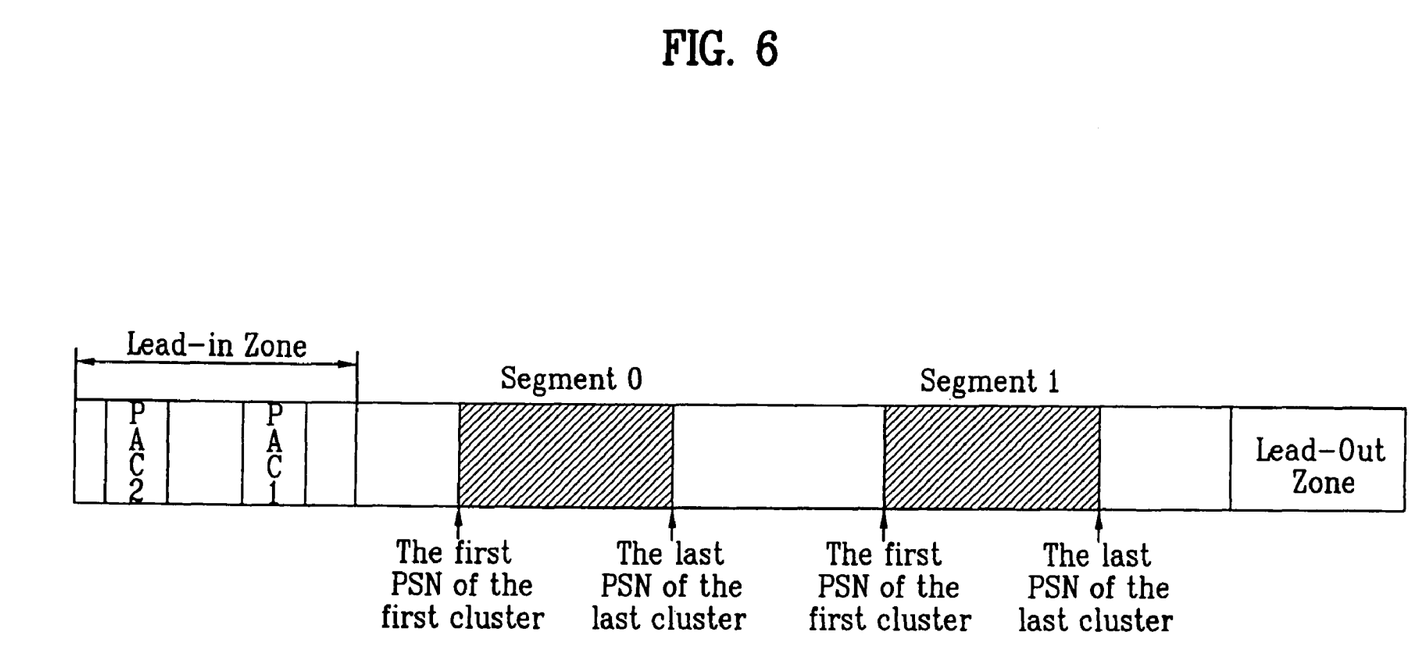
FIG. 6 illustrates segment zones on a high density optical disc in accordance with an example embodiment of the present invention.

Segments are described in more detail below. FIG. 6 illustrates segment zones on a high density optical disc in accordance with an example embodiment of the present invention.

Referring to FIG. 6, if required, there may be a maximum number (for example, 32) of segment areas on the high density optical disc, for applying the PAC thereto. The maximum number of segment area may start from "segment 0".

Up to the maximum number of segments can be allocated starting from "segment 0" in an ascending order for management by one PAC, and even if there are a plurality of PACs, total number of the segment areas managed by the PACs should not exceed the maximum number of segments.

In an example, positions of the segment areas may be identified by an optical disc drive by writing the first PSN, which may indicate a starting position of the allocated segment area and the last PSN which may indicate the last position of the allocated segment area on "Segment" fields.

In an example arrangement, none of the plurality of allocated segments need overlap and the starting and ending positions may be designated at boundaries of clusters.

Thus, in example embodiments, the present invention may provide a plurality of PACs, to manage a number (for example, 32) segment areas, which are described in more detail below.

Figure 7:
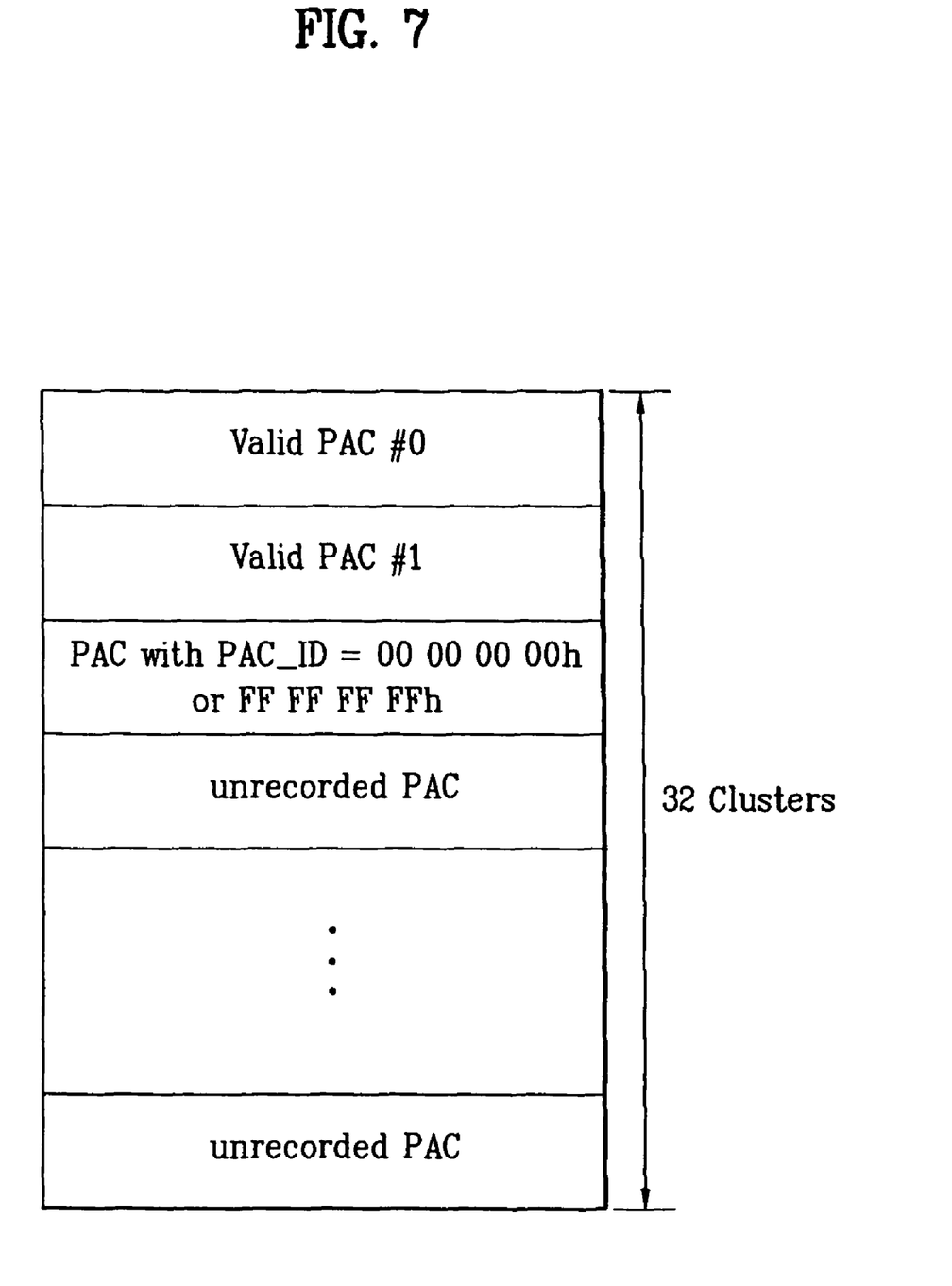
FIG. 7 illustrates a PAC zone on a high density optical disc in accordance with an example embodiment of the present invention.

FIG. 7 illustrates a PAC zone on a high density optical disc in accordance with an example embodiment of the present invention.

Referring to FIG. 7, a plurality of valid PACs, each with a common cluster size, may be written in one PAC zone (for example, the PAC zone of INFO2 or INFO1) of 32 clusters.

As described above, a valid PAC may be defined as a zone containing the various kinds of PAC information and a maximum number (for example, 32, or 64 in the case of a dual layer disc) of valid PACs may be provided on a disc, each with one cluster size that can be allocated to one PAC zone.

As described above, the valid PAC may have a PAC_ID (for example, PAC_ID=54 53 54 00h) selected in advance according to a drive version of the optical disc having the PAC recorded thereon, and a remainder of the PAC zone may have a PAC of FF FF FF FFh recorded thereon if the PAC_ID is 00 00 00 00h, and the PAC zone not recorded yet is still an unrecorded PAC zone.

In an example embodiment, if a defect occurs at one PAC zone the PAC is to be written thereon, the PAC may be written at an area next to the defective area. The defect may be caused by damage to, or contamination of a disc surface, and when the defect occurs at the area the PAC is to be written thereon, the PAC information may be written on an area next to the defective area.

An example of a plurality of valid PACs which can be allocated to a PAC zone having various kinds of information on controllable areas of the disc, are described with reference to FIG. 8.

Figure 8:
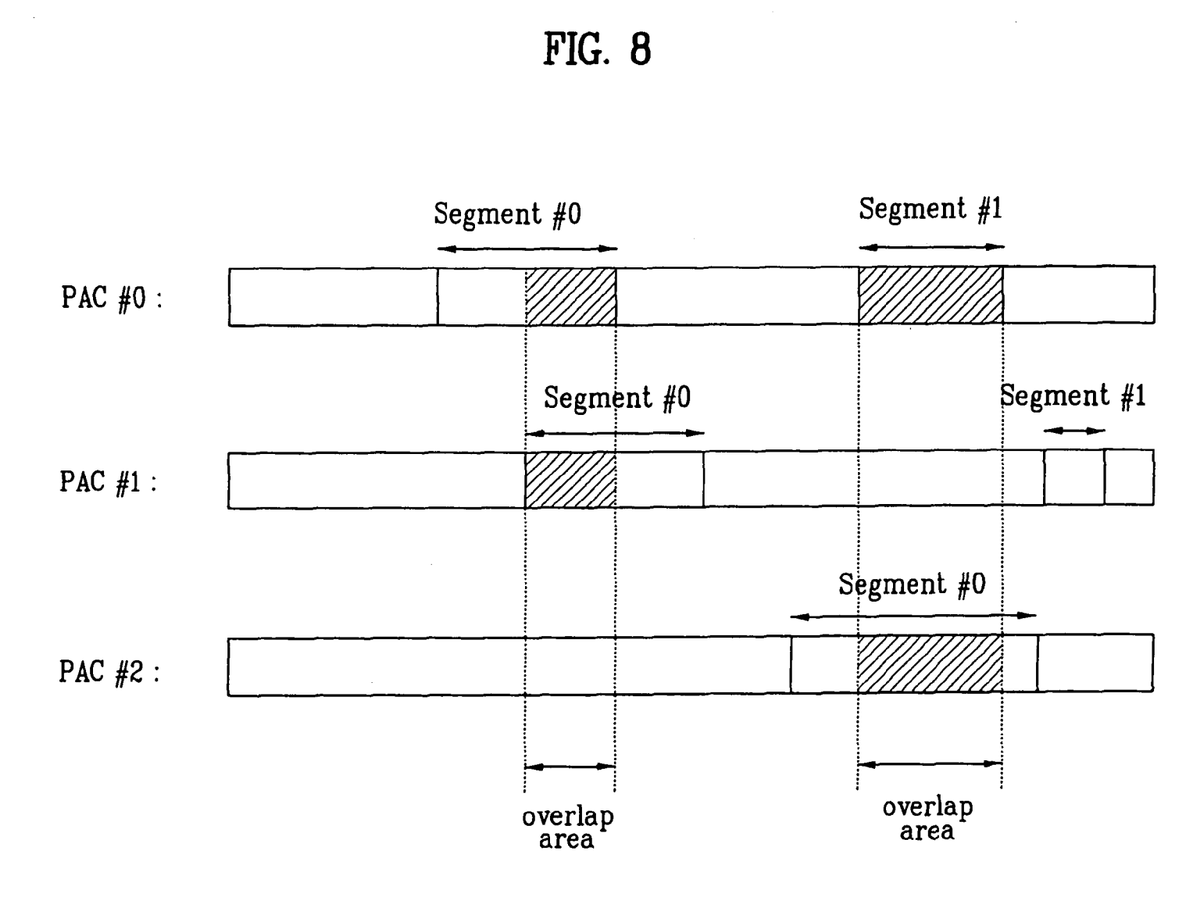
FIG. 8 illustrates segment zones managed by a plurality of PAC zones on a high density optical disc in accordance with an example embodiment of the present invention.

FIG. 8 illustrates segment zones managed by a plurality of PAC zones on a disc (for example, a high density optical disc) in accordance with an example embodiment of the present invention.

Referring to FIG. 8, controllable segment areas may be designated on the disc by using a plurality of PACs. That is, it is possible to control a segment 0 Seg #0, and segment 1 Seg #1 areas through PAC #0 on the disc, a segment 0 Seg #0, and segment 1 Seg #1 areas on the disc through PAC #1, and segment 0 Seg #0 area on the disc through PAC #2.

In this example, though none of the segments areas managed by one PAC overlap, the segments areas managed by different PACs may overlap as shown in FIG. 8.

In an example where the segment areas managed by different PACs overlap with each other, there can be cases where description of control by the PACs on the overlapped areas contradict each other, which is also described with reference to FIG. 8.

Referring to FIG. 8, segment #0 area managed by PAC #0 and segment #0 area managed by PAC #1 overlap to form a first overlap area, and segment #1 area managed by PAC #0 and segment #0 area managed by PAC #2 overlap to form a second overlap area.

As shown, there can be an overlap area of segments managed by different PACs and there may be a contradiction of control for the overlapped segment areas, for example, control of segment #0 by PAC #1 may be read only while control of segment #0 by PAC #0 may be read/write.

According to an example embodiment of the present invention, when the segments managed by different PACs overlap, several different methods may be applied to control the overlapped area. In an example embodiment, an OR-function may be applied, where, if one PAC does not allow (i.e. excludes), a certain control operation, the operation is not allowed, regardless of whether the other PAC allows the operation or not. In other words, if both (or all) PACs allow a certain control operation, the certain control operation is allowed for the overlapped area.

For example, in the above illustrative case, because control of segment #0 managed by PAC #0 is both writing and reading and control of segment #0 managed by PAC #1 is reading only, the control of the overlapped segment areas may be reading only. In other words, if both writing and reading are allowed for the segment #0 managed by the PAC #0 and writing is not allowed but only reading is allowed for the segment #0 managed by the PAC #1, writing is not allowed but only reading is allowed for the overlapped segment areas. Table 1 illustrates the above example.

TABLE 1

|  | PAC # 0 | PAC # 1 | Overlapped segment Area |
|---|---|---|---|
| Reading | 0 (Allowed) | 0 (Allowed) | 0 (Allowed) ← 0 OR 0 |
| Writing | 0 (Allowed) | 1 (Not Allowed) | 1 (Not Allowed) ← 0 OR 1 |

In another example embodiment, an AND-function may be applied, where, if one PAC allows a certain control operation, the operation is allowed, regardless of whether the other PAC allows the operation or not. For example, in another illustrative case, if control of segment #0 managed by PAC #0 allows both writing and reading and control of segment #0 managed by PAC #1 is reading only, the control of the overlapped segment area is reading and writing. Table 2 illustrates the above example.

TABLE 2

|  | PAC # 0 | PAC # 1 | Overlapped segment Area |
| --- | --- | --- | --- |
| Reading | 0 (Allowed) | 0 (Allowed) | 0 (Allowed) ← 0 AND 0 |
| Writing | 0 (Allowed) | 1 (Not Allowed) | 0 (Allowed) ← 0 AND 1 |

In other example embodiments, other Boolean operation functions (or combinations thereof) could also be implemented as would be apparent in view of the discussion of example embodiments of the present invention set forth above.

In another embodiment of the present invention, in an illustrative case where segment areas managed by different PACs overlap each other, another method may be used, in which control as defined by a newly designated PAC is followed.

In an illustrative example, if PAC #1 is a PAC designated more recently in time than PAC #0, and PAC #2 is a PAC more recently in time than PAC #1, if the segment areas managed by the PACs overlap, the newly (or more recently) designated PAC may control, which will be described with reference to FIG. 8.

In the example in FIG. 8, if segment #0 area managed by PAC #0, and segment #0 area managed by PAC #1 area overlap and control by PAC #0 is reading only and the control by PAC #1 is writing and reading, the control of the overlapped area is writing and reading, which is defined by PAC #1, the newer PAC.

This control method may be termed a "New PAC Rule" different from the OR-function and the AND-function in the foregoing example embodiments.

In other example embodiments, control may be defined according to an existing or older PAC (or combinations thereof), not the newly designated PAC as would be apparent in view of the discussion of example embodiments of the present invention set forth above.

Figure 9:
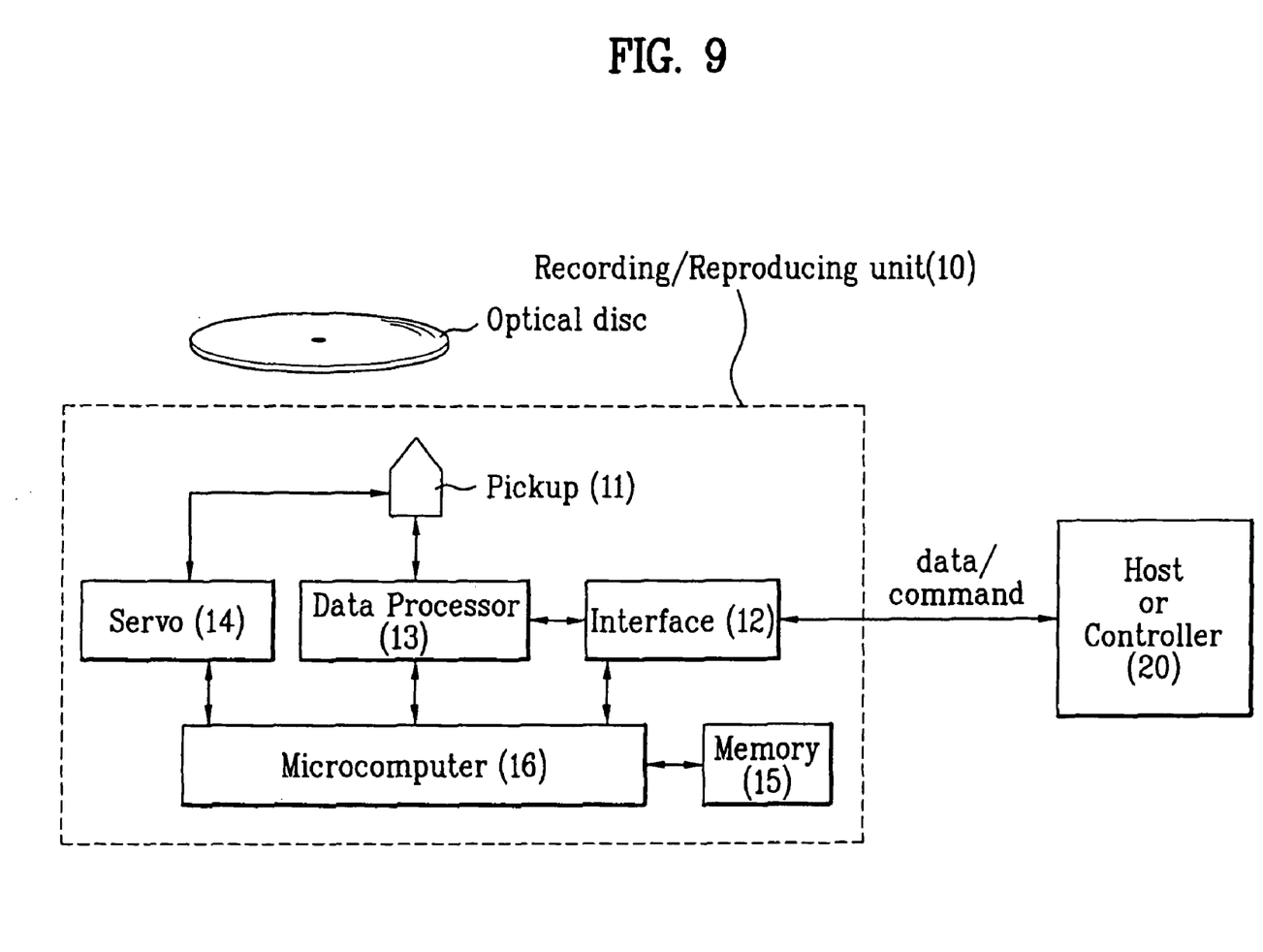
FIG. 9 illustrates an optical recording/reproducing apparatus in accordance with an example embodiment of the present invention.

FIG. 9 illustrates a block diagram of an optical recording/reproducing apparatus in accordance with an example embodiment of the present invention.

Referring to FIG. 9, the optical recording/reproducing apparatus may include a recording/reproducing device 10 for performing recording/reproduction on the optical disc and a host, or controller 20 for controlling the recording/reproducing device 10. In an example embodiment, the recording/reproducing device 10 may act as the "optical disc drive" discussed above in conjunction with many example embodiments of the present invention.

In an example embodiment, the host 20 gives a writing or reproduction instruction to write to or reproduce from a particular area of the optical disc to the recording/reproducing device 10, and the recording/reproducing device 10 performs the recording/reproduction to/from the particular area in response to the instruction from the host 20.

The recording/reproducing device 10 may further include an interface part 12 for performing communication, such as exchange of data and instructions with the host 20, a pickup part 11 for writing/reading a data to/from the optical disc directly, a data processor 13 for receiving a signal from the pickup part 11 and recovering a desired signal value or modulating a signal to be written into a signal able to be written on the optical disc, a servo part 14 for controlling the pickup part 11 to read a signal from the optical disc accurately or to write a signal on the optical disc accurately, a memory 15 for temporary storage of various kinds of information including management information and data, and a microcomputer 16 for controlling various parts of the recording/reproducing device 10.

An example method for recording a PAC on a high density writable optical disc using the example optical recording/reproducing apparatus will be described below.

Upon inserting the optical disc into the optical recording/reproducing apparatus, management information may be read from the optical disc and stored in the memory 15 of the recording/reproducing device 10, for use at the time of recording/reproduction of the optical disc.

In this state, if the user desires to write on a particular area of the optical disc, the host 20, taking this as a writing instruction, provides information on a desired writing position to the recording/reproducing device 10, together with a data to be written.

The microcomputer 16 in the recording/reproducing device 10 may receive the writing instruction, determine if the area of the optical disc the host 20 desires to write is a defective area or not from the management information stored in the memory 15, and/or perform data writing according to the writing instruction from the host 20 on an area which is not a defective area.

If it is determined that writing on an entire disc or on a particular area of the disc includes new features which a previous version of the recording/reproducing device is not provided with, leading the previous version of the recording/reproducing device to fail to sense, or if it is intended to restrict functions, such as writing or reproducing to/from a particular area of the disc according to restriction set by the user, the microcomputer 16 of the recording/reproducing device 10 may write control information of the area in the PAC zone on the disc as an "Unknown PAC rule". The microcomputer 16 of the recording/reproducing device 10 may also write PAC information, such as the PAC_ID for a written state, and segment information which is control information on the particular area of the disc.

PAC information may be written in a plurality of valid PACs on the PAC 1 zone of the INFO 1 zone as required at a one cluster size and a copy of the PAC recorded on the PAC1 zone may be written on the PAC2 zone of the INFO 2 zone as a backup.

The microcomputer 16 may provide position information of the area the data is written thereon, or the PAC zone, and the data to the servo 14 and the data processor 13, so that the writing is finished at a desired position on the optical disc through the pickup part 11.

Additionally, a method for recording/reproducing the high density optical disc having PAC information written by the above example method will be described below.

Upon inserting an optical disc into the optical recording/reproducing apparatus, management information may be read from the optical disc and stored in the memory 15 of the recording and reproducing device 10, for use at the time of recording and reproduction of the optical disc.

The information in the memory 10 may include position information of various zones included in the PAC zone on the disc. Particularly, positions of valid PACs in the PAC zone may be known from disc definition structure (DDS) information. After positions of the valid PACs are known, a PAC_ID field of the PAC may be examined, for verifying if the PAC_ID is an identifiable PAC_ID.

If the PAC_ID is identifiable, the method determines that a recording and reproducing device having written the data on the disc has a version identical to a version of the present recording and reproducing device or there are no separate writing/reproduction restrictions, and the recording/reproduction is performed according to the instruction from the host 20.

If the PAC_ID is not identifiable, the method determines that the recording and reproducing device having written the data on the disc has a version different from the version of the present recording and reproducing device, and the recording/reproduction is preformed according to the instruction from the host with reference to recording/reproduction restriction areas on the disc including the "Unknown PAC rule" and the "segment". In a case where the segment areas managed by different PACs overlap, control information for recording and/or reproducing of the overlapped area is determined based on the control permitted by the different PACs, using one or more of the example rules set forth above.

The microcomputer 16 may then provide the location information and data according to the instruction from the host to the servo 14 and the data-processor 13, so that the recording/reproduction is finished at a desired location on the optical disc through the pickup part 11.

As described above, the methods and apparatus for recording and reproducing in a high density optical write-once disc according to example embodiments of the present invention may have one or more of the following advantages.

First, the definition of an accessible area of a disc of a different version drive by using PACs may permit more robust protection of a data area having user data recorded thereon, for example, to prevent or reduce unauthorized access (for example, hacking).

Second, effective recording data to and/or reproducing data from a high density optical disc is improved by using a PAC which manages the entire data area or a part of the data area of the disc.

It will be apparent to those skilled in the art that various modifications and variations can be made to the example embodiments of the present invention described above without departing from the spirit or scope of the invention. Thus, it is intended that the present invention covers the modifications and variations of this invention provided they come within the scope of the appended claims and their equivalents.

What is claimed is:

1. A recording medium storing an executable data structure for managing access of the recording medium by a recording or reproducing apparatus, comprising:
    a data area storing a plurality of segment regions each having a start point and an end point that are located at boundaries between recording units; and
    a control data area storing a plurality of access control information units permitting reproduction compatibility between the recording medium and a drive, the access control information units including segment data for identifying at least one of the segment regions in the data area and control data for controlling access to the at least one segment region, the access control information units including predetermined rules specifying operations applicable to the recording medium when the access control information units are not identified by the apparatus, the access control information units being located in at least one of a lead-in area and an inner area of the recording medium.

2. The recording medium of claim 1, wherein access includes at least one of a reading operation and a writing operation.

3. The recording medium of claim 1, wherein a total number of the segments included in the data area is less than or equal to a maximum number.

4. The recording medium of claim 1, further comprising:
    an area storing a copy of the access control information units.

5. The recording medium of claim 1, wherein the recording unit is a cluster.

6. The recording medium of claim 1, wherein if the segment regions identified by at least two different access control information units are overlapping each other, only operations allowed by all of the access control information units related to the overlapping segment regions are applied to the overlapping segment regions.

7. The recording medium of claim 6, wherein the access to the at least one overlapped segment region is controlled according to an overlap rule, the overlap rule being an "OR" rule.

8. A method of reproducing data from a recording medium with a reproducing apparatus, the method comprising:
    reading a plurality of access control information units from a control data area of the recording medium, the access control information units permitting reproduction compatibility between the recording medium and a drive, the access control information units including segment data for identifying at least one segment region in a data area of the recording medium and control data for controlling access to the at least one segment region, the access control information units including predetermined rules specifying operations applicable to the recording medium when the access control information units are not identified by the apparatus; and
    accessing the at least one segment region identified by the access control information units, the at least one segment region having a start point and an end point that are boundaries between recording units, the access control information units located in at least one of a lead-in area and an inner area of the recording medium.

9. The method of claim 8, wherein the access includes at least one of a reading operation and a writing operation.

10. The method of claim 8, wherein a total number of segments included in the data area is less than or equal to a maximum number.

11. The method of claim 8, wherein the recording unit is a cluster.

12. The method of claim 8, wherein if the segment regions identified by at least two different access control information units are overlapping each other, only operations allowed by all of the access control information units related to the overlapping segment regions are applied to the overlapping segment regions.

13. The method of claim 12, further comprising:
    controlling access to the at least one overlapped segment region according to an overlap rule, wherein the overlap rule is an "OR" rule.

14. A method of recording data on a recording medium, comprising:
    recording a plurality of access control information units to a control data area of the recording medium, the access control information units permitting reproduction compatibility between the recording medium and a drive, the access control information units including segment data for identifying at least one segment region in a data area of the recording medium and control data for controlling access to the at least one segment region, the access control information units including predetermined rules specifying operations applicable to the recording medium when the access control information units are not identified by the drive;

accessing the at least one segment region identified by the access control information units, the at least one segment region having a start point and an end point that are at boundaries between recording units, the access control information units located in at least one of a lead-in area and an inner area of the recording medium; and recording data on the at least one segment region.

15. The method of claim 14, wherein access includes a writing operation.

16. The method of claim 14, wherein a total number of the segments included in the data area is less than or equal to a maximum number.

17. The method of claim 14, wherein the recording unit is a cluster.

18. The method of claim 14, wherein if the segment regions identified by at least two different access control information units are overlapping each other, only operations allowed by all of the access control information units related to the overlapping segment regions are applied to the overlapping segment regions.

19. The method of claim 18, further comprising:
controlling access to the at least one overlapped segment region according to an overlap rule, wherein the overlap rule is an "OR" rule.

20. An apparatus for reproducing data from a recording medium, comprising:
a pickup configured to read data from the recording medium; and
a controller operably coupled to the pickup, the controller configured to control the pick up according to a plurality of access control information units recorded in a control data area of the recording medium, the access control information units permitting reproduction compatibility between the recording medium and the apparatus, the access control information units including segment data identifying a segment region in a data area of the recording medium and control data for controlling access to the segment region, the segment region having a start point and an end point that are located at boundaries between recording units, the access control information units including predetermined rules specifying operations applicable to the recording medium when the access control information units are not identified by the apparatus,
the controller configured to control the pick up to access the segment region identified by the access control information units, the access control information units located in at least one of a lead-in area and an inner area of the recording medium.

21. The apparatus of claim 20, wherein access includes a reading operation.

22. The apparatus of claim 20, wherein a total number of segments included in the data area is less than or equal to a maximum number.

23. The apparatus of claim 20, wherein the recording unit is a cluster.

24. The apparatus of claim 20, further comprising:
a host device configured to generate a command of reproduction and send the command to the controller.

25. The apparatus of claim 20, wherein if the segment regions identified by at least two different access control information units are overlapping each other, the controller is configured to apply only operations allowed by all of the access control information units related to the overlapping segment regions to the overlapping segment regions.

26. The apparatus of claim 25, wherein the controller controls access to the at least one overlapped segment region according to an overlap rule, wherein the overlap rule is an "OR" rule.

27. An apparatus for recording data on a recording medium, comprising:
a pickup configured to write data on the recording medium; and
a controller operably coupled to the pickup, the controller configured to control the pick up according to a plurality of access control information units recorded in a control data area of the recording medium, the access control information units permitting reproduction compatibility between the recording medium and the apparatus, the access control information units including segment data for identifying a segment region in a data area of the recording medium and control data for controlling access to the segment region, the segment region having a start point and an end point that are located at boundaries between recording units, the access control information units including predetermined rules specifying operations applicable to the recording medium when the access control information units are not identified by the apparatus,
the controller being configured to control the pick up to access the segment region identified by the access control information units, the access control information units located in at least one of a lead-in area and an inner area of the recording medium.

28. The apparatus of claim 27, wherein access includes a writing operation.

29. The apparatus of claim 27, wherein a total number of segments included in the data area is less than or equal to a maximum number.

30. The apparatus of claim 27, wherein the recording unit is a cluster.

31. The apparatus of claim 27, further comprising:
a host device configured to generate a recording command and send the recording command to the controller.

32. The apparatus of claim 27, wherein if the segment regions identified by at least two different access control information units are overlapping each other, the controller is configured to apply only operations allowed by all of the access control information units related to the overlapping segment regions to the overlapping segment regions.

33. The apparatus of claim 32, wherein the controller controls access to the at least one overlapped segment region according to an overlap rule, wherein the overlap rule is an "OR" rule.

* * * * *